US008435038B2

(12) United States Patent
Wilson et al.

(10) Patent No.: US 8,435,038 B2
(45) Date of Patent: May 7, 2013

(54) METHODS AND SYSTEMS FOR TEACHING A PRACTICAL SKILL TO LEARNERS AT GEOGRAPHICALLY SEPARATE LOCATIONS

(75) Inventors: Ramona Wilson, Santaquin, UT (US); Amy Kristine Banks, Payson, UT (US); Kenneth A. Murdock, Springville, UT (US)

(73) Assignee: Apollo Finance, LLC, Springville, UT (US)

( * ) Notice: Subject to any disclaimer, the term of this patent is extended or adjusted under 35 U.S.C. 154(b) by 1560 days.

(21) Appl. No.: 11/550,281

(22) Filed: Oct. 17, 2006

(65) Prior Publication Data

US 2008/0090219 A1 Apr. 17, 2008

(51) Int. Cl.
*G09B 19/00* (2006.01)

(52) U.S. Cl.
USPC .......................................... 434/219; 434/350

(58) Field of Classification Search .................. 434/262, 434/350, 322, 323, 219
See application file for complete search history.

(56) References Cited

U.S. PATENT DOCUMENTS

| | | | | |
|---|---|---|---|---|
| 3,987,484 A | * | 10/1976 | Bosche et al. | 386/69 |
| 4,785,472 A | | 11/1988 | Shapiro | |
| 4,939,801 A | * | 7/1990 | Schaal et al. | 5/607 |
| 5,376,007 A | * | 12/1994 | Zirm | 434/262 |
| 5,537,141 A | | 7/1996 | Harper et al. | |
| 5,767,897 A | * | 6/1998 | Howell | 348/14.07 |
| 5,791,908 A | * | 8/1998 | Gillio | 434/262 |
| 5,823,786 A | | 10/1998 | Easterbrook | |
| 5,850,250 A | * | 12/1998 | Konopka et al. | 348/14.07 |
| 5,853,292 A | | 12/1998 | Eggert et al. | |
| 5,915,973 A | * | 6/1999 | Hoehn-Saric et al. | 434/350 |
| 5,974,446 A | * | 10/1999 | Sonnenreich et al. | 709/204 |
| 6,074,213 A | * | 6/2000 | Hon | 434/262 |
| 6,155,840 A | | 12/2000 | Sallette | |
| 6,193,519 B1 | | 2/2001 | Eggert et al. | |
| 6,288,753 B1 | | 9/2001 | DeNicola et al. | |
| 6,301,462 B1 | | 10/2001 | Freeman et al. | |
| 6,302,698 B1 | * | 10/2001 | Ziv-El | 434/323 |
| 6,336,813 B1 | | 1/2002 | Siefert | |
| 6,347,333 B2 | | 2/2002 | Eisendrath et al. | |
| 6,381,444 B1 | * | 4/2002 | Aggarwal et al. | 434/350 |
| 6,517,351 B2 | | 2/2003 | Spector | |
| 6,518,988 B1 | | 2/2003 | Aghevli | |
| 6,559,867 B1 | | 5/2003 | Kotick et al. | |
| 6,611,822 B1 | | 8/2003 | Beams et al. | |
| 6,615,020 B2 | | 9/2003 | Richter | |
| 6,688,891 B1 | | 2/2004 | Sanford | |
| 6,704,541 B1 | | 3/2004 | Ciarallo et al. | |
| 6,739,877 B2 | * | 5/2004 | Bailey et al. | 434/262 |
| 6,813,473 B1 | * | 11/2004 | Bruker | 434/350 |

(Continued)

*Primary Examiner* — Robert J Utama
(74) *Attorney, Agent, or Firm* — Steve P. Hassid; Silicon Edge Law Group, LLP

(57) ABSTRACT

A method for teaching a practical skill to a plurality of learners at geographically separate locations includes receiving, for each learner, a video feed generated by a camera at the learner's location. The video feed depicts at least an subject on which the learner is demonstrating the practical skill. The teacher simultaneously displays the video feeds for the plurality of learners on a display screen at a location of the teacher. One or more learners are allowed to submit questions to the teacher that are not immediately conveyed to the other learners. The teacher is allowed to select one of the learners having a question for individualized instruction, and to establish a private communication channel between the teacher and the selected learner.

59 Claims, 11 Drawing Sheets

U.S. PATENT DOCUMENTS

| | | |
|---|---|---|
| 6,813,474 B2 | 11/2004 | Robinson et al. |
| 6,909,874 B2 | 6/2005 | Holtz et al. |
| 6,941,105 B1 | 9/2005 | Rowley et al. |
| 6,950,116 B2 | 9/2005 | Ternullo |
| 6,988,138 B1 | 1/2006 | Alcorn et al. |
| 7,003,728 B2 | 2/2006 | Berque |
| 7,014,467 B2 | 3/2006 | Krebs |
| 7,024,033 B2 | 4/2006 | Li et al. |
| 7,031,651 B2 | 4/2006 | McCormick |
| 7,047,279 B1 | 5/2006 | Beams et al. |
| 7,164,347 B2 * | 1/2007 | Nita .................. 340/326 |
| 2002/0085030 A1 * | 7/2002 | Ghani ................. 345/751 |
| 2002/0087560 A1 * | 7/2002 | Bardwell ............. 707/100 |
| 2003/0023686 A1 | 1/2003 | Beams |
| 2003/0158957 A1 * | 8/2003 | Abdolsalehi ......... 709/231 |
| 2003/0235407 A1 * | 12/2003 | Lord .................. 386/96 |
| 2004/0002048 A1 | 1/2004 | Thurmaier et al. |
| 2004/0002049 A1 | 1/2004 | Beavers et al. |
| 2004/0191748 A1 | 9/2004 | Thean |
| 2004/0224294 A1 | 11/2004 | Heininger |
| 2005/0009550 A1 | 1/2005 | Akgun et al. |
| 2005/0084833 A1 * | 4/2005 | Lacey et al. ......... 434/262 |
| 2005/0134746 A1 | 6/2005 | Brandt |
| 2005/0208461 A1 | 9/2005 | Krebs |
| 2006/0084050 A1 | 4/2006 | Haluck |
| 2006/0187900 A1 | 8/2006 | Akbar |

* cited by examiner

METHODS AND SYSTEMS FOR TEACHING A PRACTICAL SKILL TO LEARNERS AT GEOGRAPHICALLY SEPARATE LOCATIONS

TECHNICAL FIELD

This disclosure relates generally to distance learning and, more particularly, to methods and systems for teaching a practical skill to students, employees, or other learners at geographically separate locations.

BRIEF DESCRIPTION OF THE DRAWINGS

Non-limiting and non-exhaustive embodiments of the disclosure are described with reference to the Figures, in which.

DETAILED DESCRIPTION

The embodiments of the disclosure will be best understood by reference to the Figures, wherein like elements are designated by like numerals throughout. In the following description, numerous specific details are provided for a thorough understanding of the embodiments described herein. However, an artisan will recognize that one or more of the specific details may be omitted, or other methods, components, or materials may be used.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order expressed in the Figures or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Several aspects of the embodiments described will be illustrated as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Figure 1:
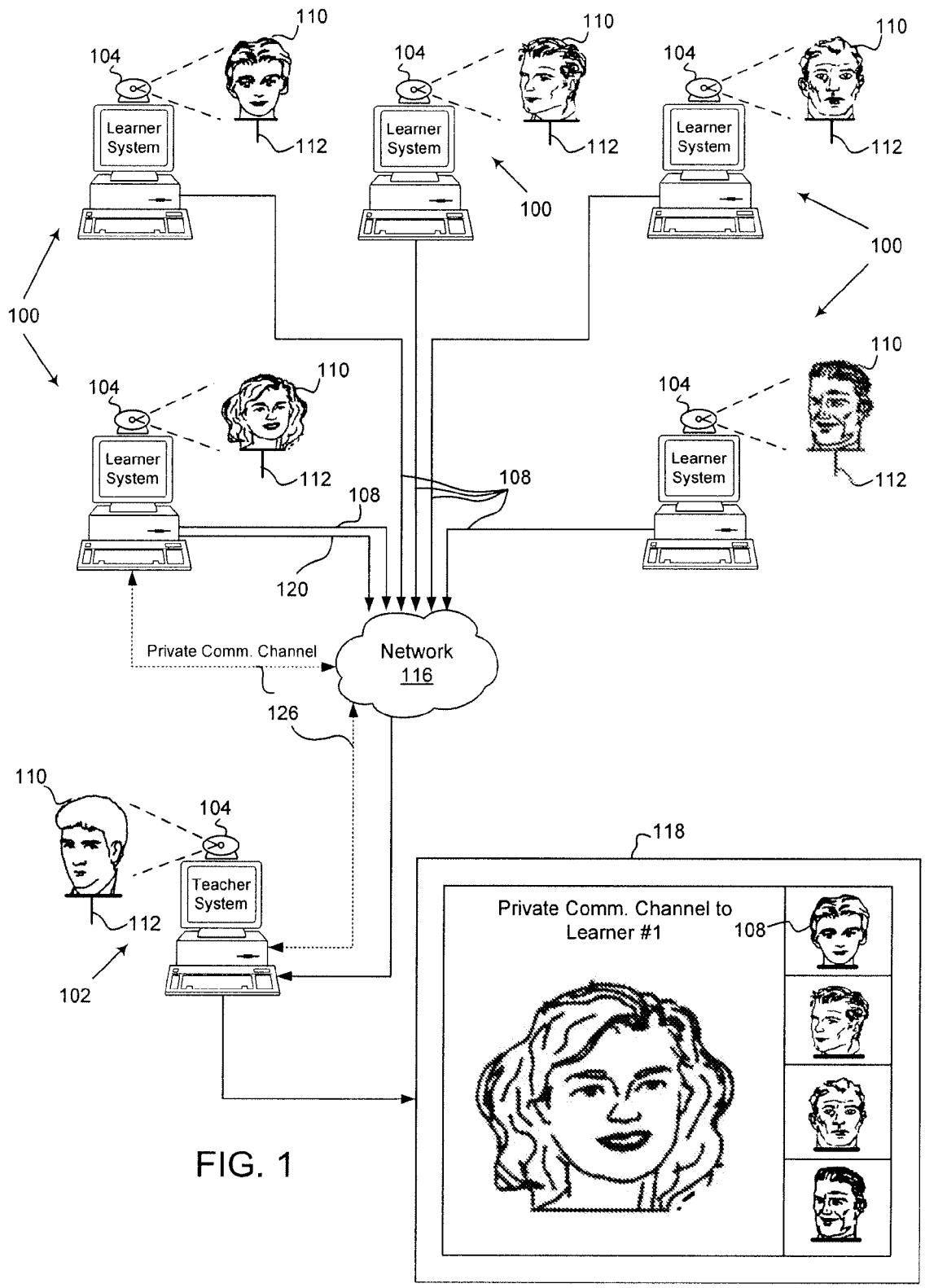
FIG. 1 is a data flow diagram of a system for teaching a practical skill to learners at geographically separate locations.

FIG. 1 illustrates one embodiment of a system for enabling a teacher to instruct a plurality of learners, at geographically separate locations, in a practical skill. By way of illustration, but not of limitation, the practical skill may include cosmetology, which is the art or profession of cosmetically treating skin, hair, and nails. Cosmetology often includes, but is not limited to, manicures, pedicures, application of artificial nails, hair cutting and styling, special occasion hairstyling, shampooing hair, cosmetic application, body hair removal, chemical hair relaxers or straighteners, permanent waves, coloring and highlighting of hair, and hair extensions or wig treatments. A person who is licensed in cosmetology is referred to a cosmetologist, but is sometimes called a beautician, a beauty specialist, or an esthetician or aesthetician.

An artisan will recognize, however, that the methods and systems disclosed herein may be used for teaching other practical skills to one or more learners, non-exhaustive examples of which include carpentry, automotive repair, graphic design, culinary arts, plumbing, fashion design, and the like. Thus, the examples herein relating to cosmetology should not be considered limiting, but merely illustrative, of applications of the claimed systems and methods.

In one embodiment, each learner may be given (or have access to) a network-enabled computing device, referred to herein as a learner system 100. A learner system 100 may be embodied, for instance, as a desktop or laptop computer, although other network-enabled computing devices, such as interactive television (iTV) systems, personal digital assistants (PDAs), or the like, may be used.

In one embodiment, a teacher of the practical skill may also be provided (or have access to) a network-enabled computing device, referred to herein as a teacher system 102. The teacher system 102 may also be embodied as a desktop or laptop computer, iTV system, PDA, or the like, may be located, for example, at a technical school, a cosmetology school, a hair salon, the teacher's home, or other suitable locations at which it is convenient for the teacher to work.

The learner and teacher systems 100, 102 may each be equipped with a camera 104, such as a webcam. Various webcams are known in the art, such as a Logitech® Quick-Cam®. In other embodiments, however, one or more of the learner systems 100 and/or the teacher system 102 may be connected to a portable video camera, such as a Panasonic® PV-GS180 or the like. Each camera 104 may be connected to its respective learner or teacher system 100, 102 via USB (Universal Serial Bus), Firewire®, or other standard interfaces. In one embodiment, the cameras 104 may be configured to capture motion video and/or still images, referred to hereafter as video feeds 108.

In one embodiment, each camera 104 may be oriented on a subject 110 on which a learner is to practice and/or demonstrate the practical skill. Although not illustrated, each camera 104 may also be oriented to at least partially capture the learner within its field of view. This may allow the teacher to periodically monitor the learner to ensure that he or she is on task.

The subject 110 may be placed on a rotatable base 112 to allow different sides of the subject 110 to be rotated into the field of view of the camera 104. In certain embodiments, the rotatable base may tilt to more easily show the top or bottom areas of the subject 110. For instance, the rotatable base may be coupled to a hinge, a rotor, or the like with an appropriate tensioning or locking mechanism to hold rotatable base at a desired angle.

In an alternative embodiment, the subject 110 may be stationary, and the camera 104 may be configured to move, pan, tilt, or zoom to view or focus on different portions of the subject 110. In still other embodiments, multiple cameras 104 may provide different views of the subject 110.

As will be discussed in greater detail below, the teacher system 102 may also include one or a plurality of cameras 104 for capturing demonstration video feeds 108 for distribution in a live or recorded format to one or more learners. For example, in one embodiment, the learners may watch the teacher perform the practical skill in the demonstration video feed 108, after which the learners will attempt to imitate the skill on their respective subjects 110. As in the case of the learner video camera(s) 104, the teacher video camera(s) 104 may be fixed or movable, and may be capable of panning, tilting, and/or zooming.

As illustrated, the subject 110 may be embodied as a mannequin head for use in cosmetology instruction. In other embodiments, however, the subject 110 may be an automotive engine, a carpenter's work piece, or the like, depending on the practical skill being taught.

In one embodiment, the video feeds 108 originating from each learner system 100 are transmitted over a network 116, such as a LAN, WAN, the Internet, etc., to the teacher system 102 to be simultaneously displayed on an associated display screen 118. In some cases, only a subset of the video feeds 108 (e.g., two or more) may be simultaneously displayed. In such an embodiment, different video feeds 108 may be displayed in the same location of the display screen 118 in an automatically rotating cycle, such that all of the video feeds 108 will be eventually displayed (although not all at the same time).

The display screen 118 may be embodied as a television screen, computer monitor, or the like, which may be large enough to display each of the video feeds 108 in a reduced-size format. For instance, the display screen 118 could be embodied as a wide-screen high-definition television (HDTV) monitor or the like.

In certain embodiments, multiple display screens 118 may be provided for different types of information. For example, one display screen 118 may be devoted to displaying the video feed 108 for one particular learner, while another display screen 118 may be used to display the rotating cycle of video feeds 108 discussed above. Yet another display screen could provide interfaces for communicating with learners. Of course, all of the foregoing could be implemented in different areas of the same display screen 118 in one embodiment.

In one embodiment, the instructor may selectively enlarge one or more of the reduced-size video feeds 108 to display the full-resolution output of the respective camera(s) 104. The selected video feed(s) 108 may be enlarged to fill all or some defined portion of the display screen 118, as illustrated in FIG. 1.

One or more learners may submit text or audio questions (or comments) 120 over the network 116 to the teacher that are not immediately conveyed to the other learners. As used herein, the term "question" may include any feedback provided by a learner, including comments or the like. Still or moving images ("instant replays") taken by the camera 104 may accompany a question 120, for instance, to allow the teacher to see actually what was being captured by the learner's camera 104 at the time of the question 120. This may allow the teacher to better understand the context of the question 120 and/or allow the learner to bring specific issues to the teacher's attention.

As described in greater detail below, the teacher may select one of the learners submitting a question for individualized instruction, after which a private communication channel 126 may be established between the teacher and the selected learner. The selection may be made, in one embodiment, by highlighting, pointing to, or otherwise selecting one of the reduced-size video feeds 108 on the display screen 118. Alternatively, the selection may be made in response to the teacher selecting a question 120 from one of the interfaces illustrated in FIGS. 3 and 4. The private communication channel 126 may be video, audio, and/or text-based, as explained more fully hereafter.

Figure 2:
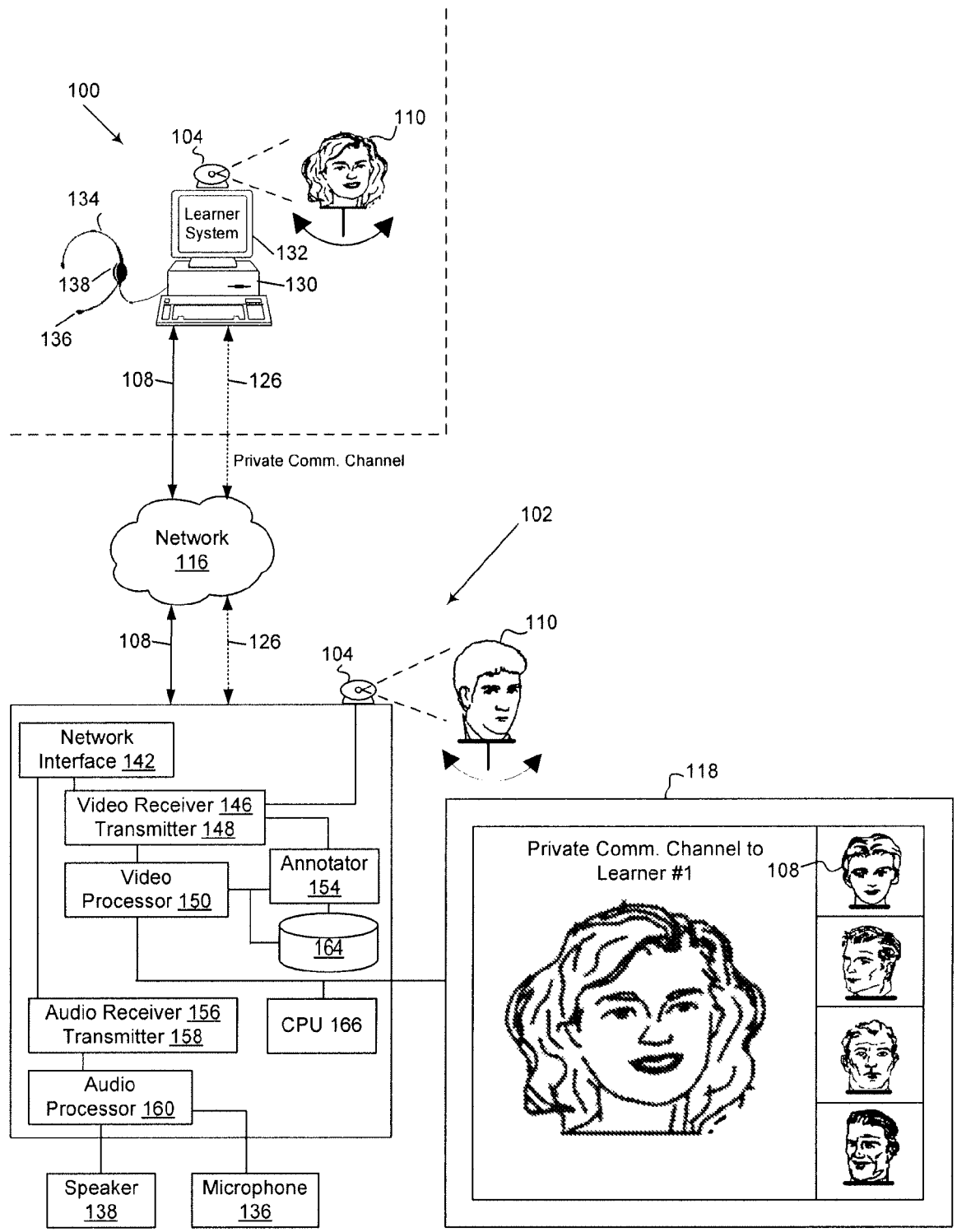
FIG. 2 is a schematic diagram of the system of FIG. 1.

FIG. 2 is a schematic diagram showing additional details of the learner and teacher systems 100, 102 in one embodiment. A learner system 100 may include a display device 132, such as a computer monitor or television, to display a video or still image received from the teacher system 102. The learner system 100 may additionally include a headset 134 having a microphone 136 and a speaker 138 for audio communication with the teacher. In alternative embodiments, the microphone 136 and/or speaker 138 may be integrated into the learner system 100 or be provided as standalone components. If a headset 134 is used, it may communicate wirelessly through the learner system 100 or through a wired connection.

As noted above, the teacher system 102 may include a camera 104 for capturing demonstration video feeds 108 (including still images) for distribution to one or more learners. A microphone 136 and/or speaker 138 may also be included with the teacher system 102, which may be incorporated in a single device, such as a headset 134 (FIGS. 5-6) as discussed with reference to the learner system 100.

Within the teacher system 102, various components, implemented as hardware, software, and/or firmware, may carry out the methods disclosed herein. Similar components may be included within each learner system 102 and, to avoid repetition, will not be discussed in detail here.

In one embodiment, the teacher system 102 may include a network interface 142 for communicating with the learner system 100 over the network 116. The teacher system 102 may also include a video receiver 146, in electrical connection with the network interface 142, for receiving the video feeds 108 generated by the cameras 104 at each learner's location. The video receiver 146 may additionally receive captured video and still images from the teacher's camera 104. Included with the video receiver 146 or as a separate component, a video transmitter 148 may allow the teacher to send video feeds 108 captured at the teacher system 102 or elsewhere to one or more of the learner systems 100.

In one embodiment, a video processor 150 in communication with the video receiver 146 processes the received video feeds 108 for simultaneous display. The video processor may include or be in electrical communication with circuitry for rendering the video feeds 108 on the display screen 118.

As described in greater detail below, a video annotator 154 may enable a teacher to add graphics and/or text to video feeds 108 before storage or transmission. This may be accomplished with a mouse, pointer, keyboard, or other input device (not shown), which facilitates annotation of the video feed. Video annotation will be discussed in detail with reference to FIGS. 5-7.

An audio receiver 156 and audio transmitter 158, in communication with the network interface 142, may receive and transmit audio, respectively. An audio processor 160 electrically communicates with the audio receiver and audio transmitter 156, 158 to process audio as captured by the microphone 136 and to be played by the one or more speaker 138 to enable audio communication between the teacher system 102 and one or more selected learner system 100.

A storage device 164, such as a hard disk drive, flash memory, random access memory, or the like, may also be included with the teacher system 102 to provide storage for the video feeds 108, and annotated versions thereof, audio messages, text messages, stored media, application programs, and the like. In one embodiment, a CPU 166 controls the operation of the foregoing components to implement the methods described hereafter.

In alternative embodiment, the teacher system 102 is not responsible for reception and distribution of all of the video feeds 108, managing communications with the learner systems 100, and the like. Rather, the teacher system 102 and the learner systems 100 may all access a centralized video server (not shown), which includes components similar to those discussed with reference to the teacher system 102. In such an embodiment, video server may receive all of the video feeds 108 from the learner systems 100 and send the teacher system 102 a composite video feed 108 comprising all of the individual video feeds. Furthermore, any demonstration video feeds 108 captured at the teacher system 102 may be sent to the video server for distribution to one or more learner systems 100. Additionally, the video server may handle all text and audio communication between the teacher system 102 and the learner systems 100. Thus, the teacher system 102 may, for most purposes, be similar or identical to the learner systems 100.

Figure 3A:
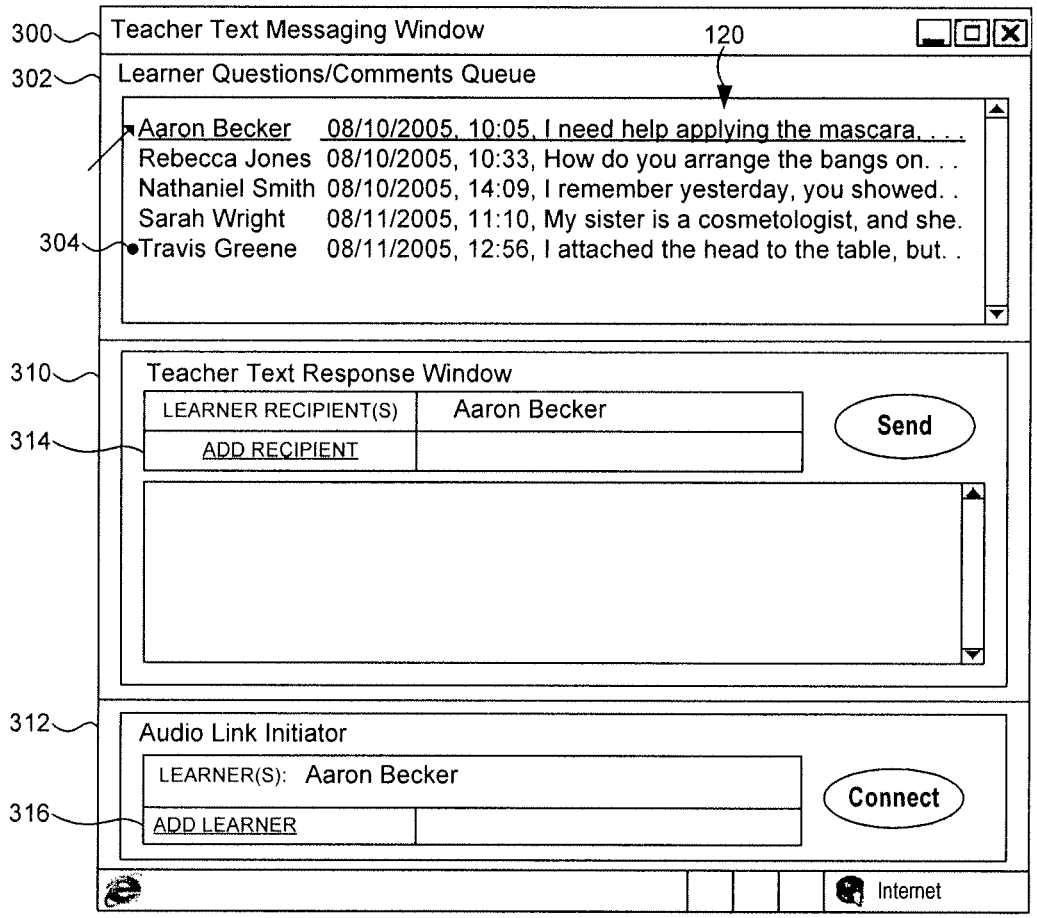
FIG. 3A is an exemplary text messaging interface for a teacher.

FIG. 3A is an exemplary text messaging interface 300 for a teacher that includes, in one embodiment, a message queue 302. Learner questions 120 may be organized chronologically according to the date and time received. In addition, the message queue 302 may display an indicator 304 that an associated question 120 is accompanied by a still image. In one embodiment, the teacher may "click on" or otherwise select the indicator to display the still image.

The teacher text messaging interface 300 may further include a teacher text response window 310 and/or an audio link initiator 312 that allow the teacher to respond to a learner selected from among those having questions 120 in the message queue 302. In one embodiment, "double clicking" on one of the learners listed in the message queue 302 results in the learner being "selected."

The teacher text messaging interface 300 automatically includes the selected learner (Aaron Becker, in this example) as the recipient, and gives the teacher the option of adding additional learners. If additional learners are added, the communication becomes non-private. The question (and response) may, therefore, be broadcast to other learners to allow them to benefit from a question/answer session between the teacher and the selected learner. The audio link initiator 312 allows the teacher to respond with a personal audio communication to the selected learner, and likewise includes the ability to add additional learners to make the responsive audio communication non-private. Audio communication may be through a public switched telephone network (PSTN), leased lines, wireless networks, or over the Internet using the Voice over IP (VoIP) protocol.

The storage device 164 may be used for storing the learners e-mail addresses, phone numbers, or other indicators for sending text-based messages or for initiating audio communication. For instance, the teacher may type part of the name of a learner in the "Add Recipient" box 314 of the teacher text response window 310 to bring up the text messaging address of the learner to be added. Furthermore, the teacher may type part of the name of a learner in the "Add Learner" box 316 of the audio link initiator 312 to bring up the audio link (or phone) number of the learner to be contacted. In the alternative, the learner's contact address or numbers may be typed in directly, browsed for in a directory, etc. Alternatively, additional recipients may be selected by simply clicking on or touching a video feed 108 of a learner on the display screen 118. In certain embodiments, a teacher may be able to select all of the learners by activating a "select all" button or the like (not shown).

Figure 3B:
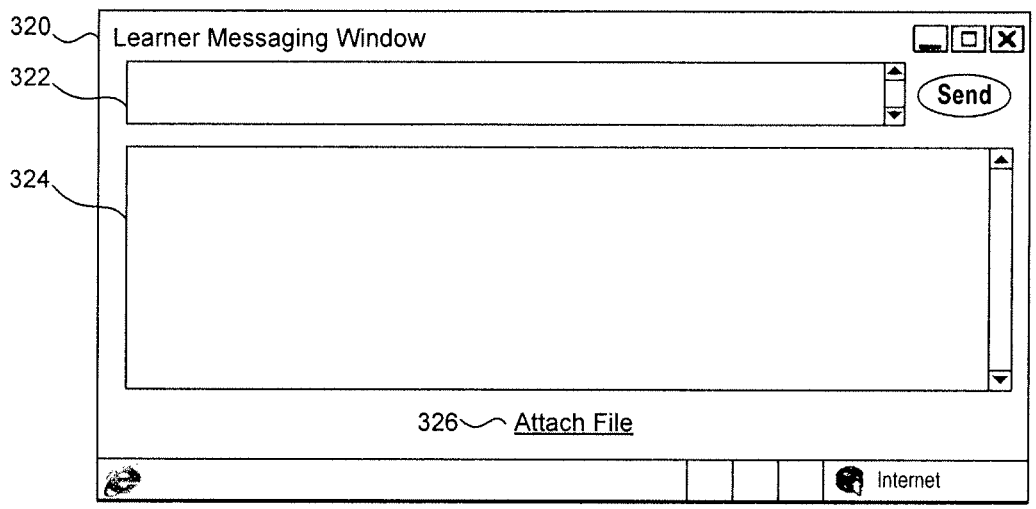
FIG. 3B is an exemplary text messaging interface for a learner.

FIG. 3B is an exemplary text messaging interface 320 for a learner, which allows a learner to communicate with the teacher (or other learner) using text messages. In a first window 322, the learner types his or her questions or responses, and in a second window 324, the learner sees his or her typed communications in addition to the teacher's responses. Each learner's typed communication will then be displayed in the message queue 302 of the teacher system 102. In one embodiment, the text messaging may be implemented through "instant" messaging (e.g., MSN Messenger®) using standard protocols. However, customized protocols may also be used in various embodiments.

In one embodiment, learners have the option of attaching a file to the text message by clicking on the "Attach File" 326 link. Such a file may include any number of demonstrative or data files, for instance a report, an image, a video clip, or an audio message, all of which are previously stored on the learner system 100. In other embodiments, an mechanism such as an on-screen button (not shown) may be provided to allow a learner to immediately capture a still image or video "instant replay" to attach to a text message.

Figure 4:
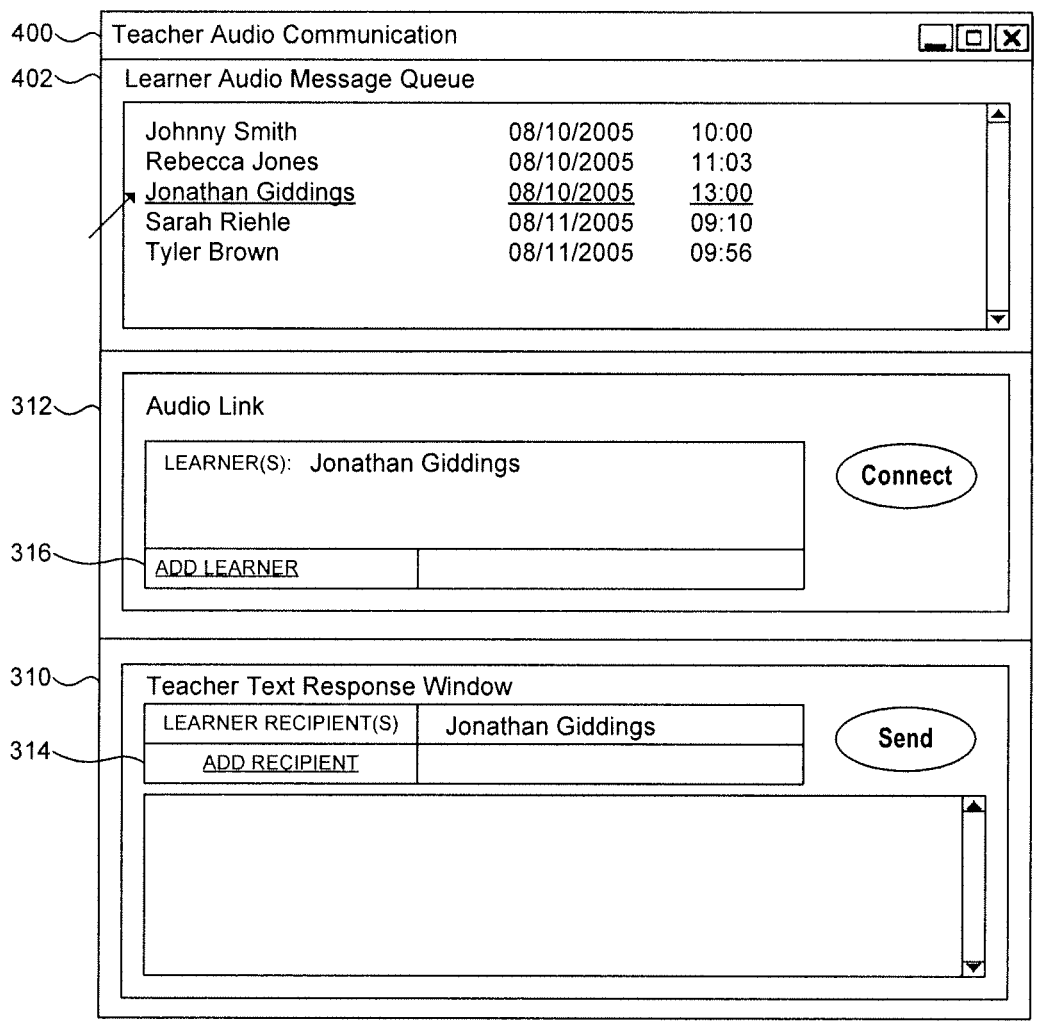
FIG. 4 is an exemplary audio communication interface for a teacher.

FIG. 4 is an exemplary audio communication interface 400 for a teacher that includes an audio message queue 402. The audio messages may be displayed chronologically based on the date and time of the message. The instructor may then browse through the audio message queue 402 and listen to selected audio messages. Upon selection of a learner (e.g., Jonathan Giddings), the learner is automatically added to an audio link initiator 312 and a teacher's text response window 310 so that the teacher may choose to respond to the learner either textually or via audio on a private communication channel.

In one embodiment, the audio link initiator 312 includes an "Add Learner" box 316 for adding additional learners, as discussed in FIG. 3, according to the contact information (handle, screen name, email address, telephone number) stored in memory or as entered or selected by the teacher. The teacher text response window 310 may also include an "Add Recipient" box 314 to add to the list of recipients that will be included in the teacher's response. The question (and response) may, therefore, be broadcast to other learners in lieu of keeping the communication private.

Figure 5:
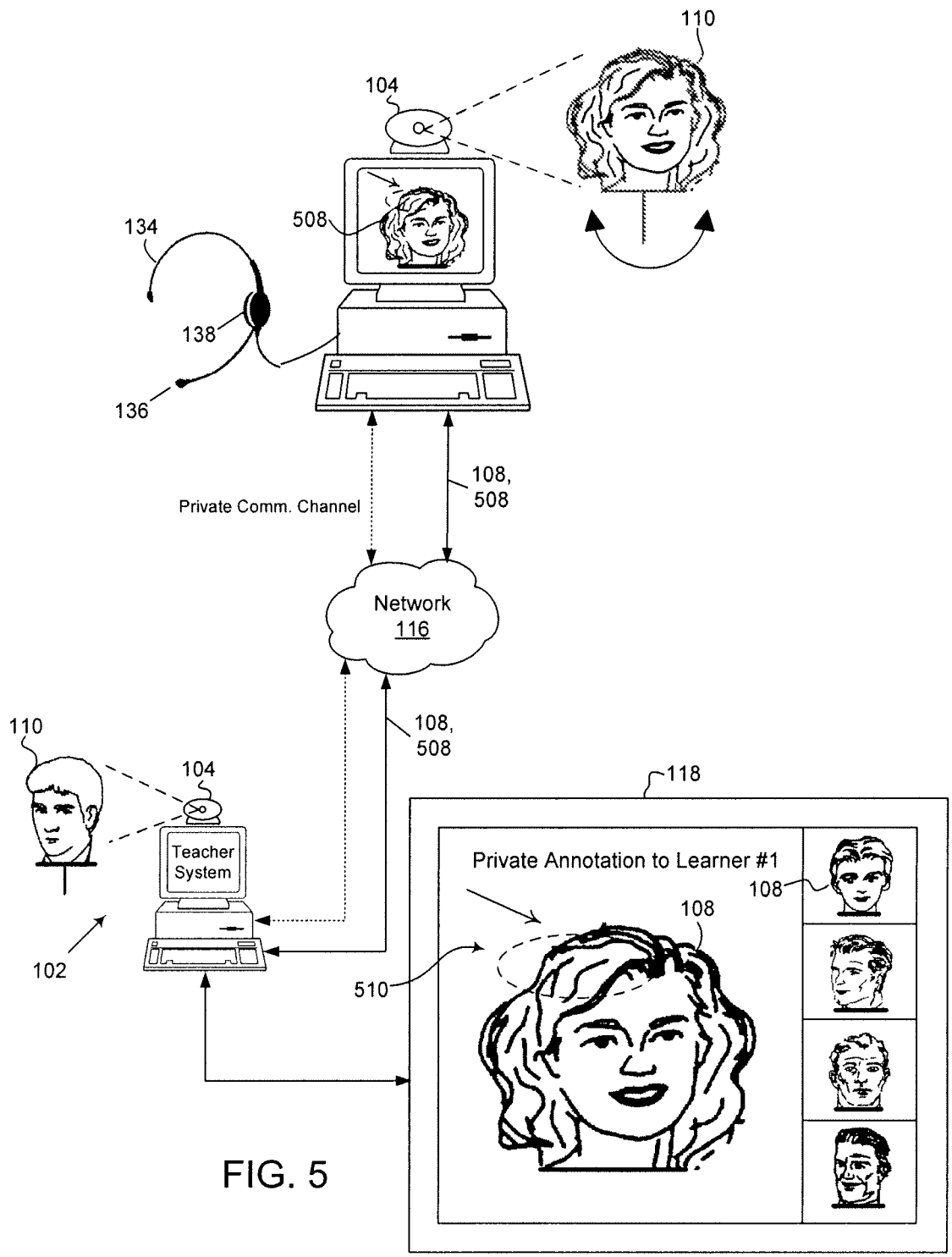
FIG. 5 is a data flow diagram illustrating a teacher's annotation of a learner's video feed.

FIG. 5 displays an embodiment of the system of FIG. 2 in which a teacher receives the video feed 108 from a learner, annotates it, and returns an annotated video feed 508 back to the selected learner. As displayed, the video feeds 108, 508 are part of a private, individualized instruction with the learner. An annotation 510 may include text or other graphics that help the teacher point out to the learner an area of the subject 110 to which the teacher is referring in a text or audio instructional response to the learner. Furthermore, the annotation 510 may be an addition to the picture or video that demonstrates proper execution of the skill to the learner. Although not displayed, the teacher also has the option of responding with the annotated video feed 508 to other learners besides the selected learner, thus making the response instructional to a wider audience than the selected learner.

Figure 6:
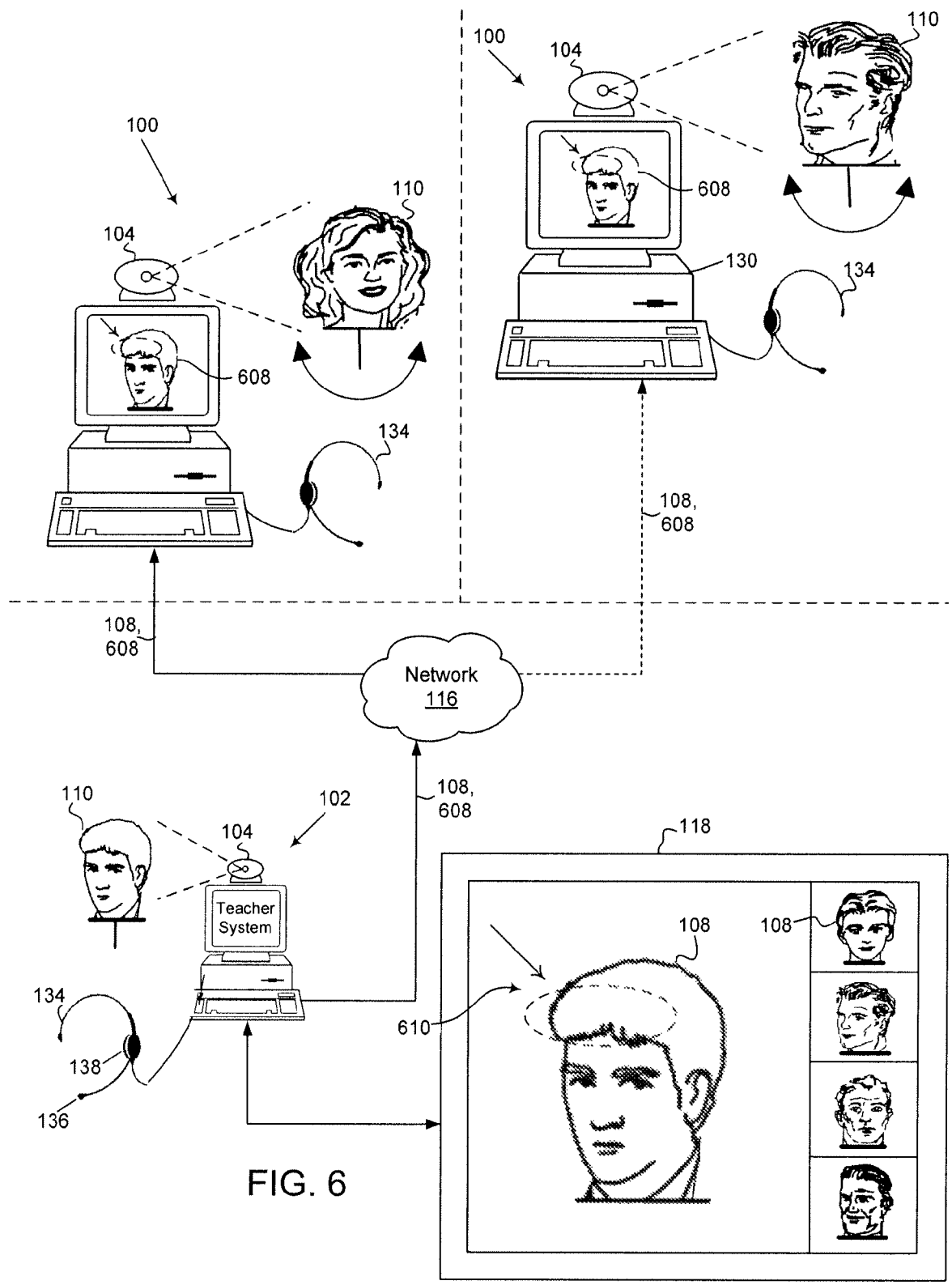
FIG. 6 is a data flow diagram illustrating a demonstration video feed being transmitted to one or more learner systems.

FIG. 6 depicts an embodiment of the system of FIG. 2 in which a demonstration video feed 108 is captured by the teacher system 102 and transmitted to one or more learner systems 100 for display thereon. The demonstration video feed 108 may include video or still images of a subject 110, such as a mannequin's head, on which the teacher can demonstrate to the learner(s) a practical skill. To aid in the instruction when transmitting the demonstration video feed 108, the teacher may send the demonstration video feed 108 with a text or an audio message (FIGS. 3-4). As noted above, demonstration video feeds 108 may be sent in a live or recorded format. Furthermore, in one embodiment, learners may be able to pause, rewind, fast forward, or otherwise navigate the demonstration video feeds 108 received from the teacher. This may allow the learner to review interesting portions of the demonstration video feed 108 when the learner is subsequently attempting to perform the practical skill on his or her subject 110. Systems for allowing a viewer to pause, rewind, and fast forward received video signals, such as Tivo®, are known in the entertainment art, but have not heretofore been applied to distance learning as disclosed herein.

Additionally, the teacher system 102 allows the teacher to transmit an annotated demonstration video feed 608 to one or more learners by adding an annotation 610 to the demonstration video feed 108 before transmission.

Figure 7:
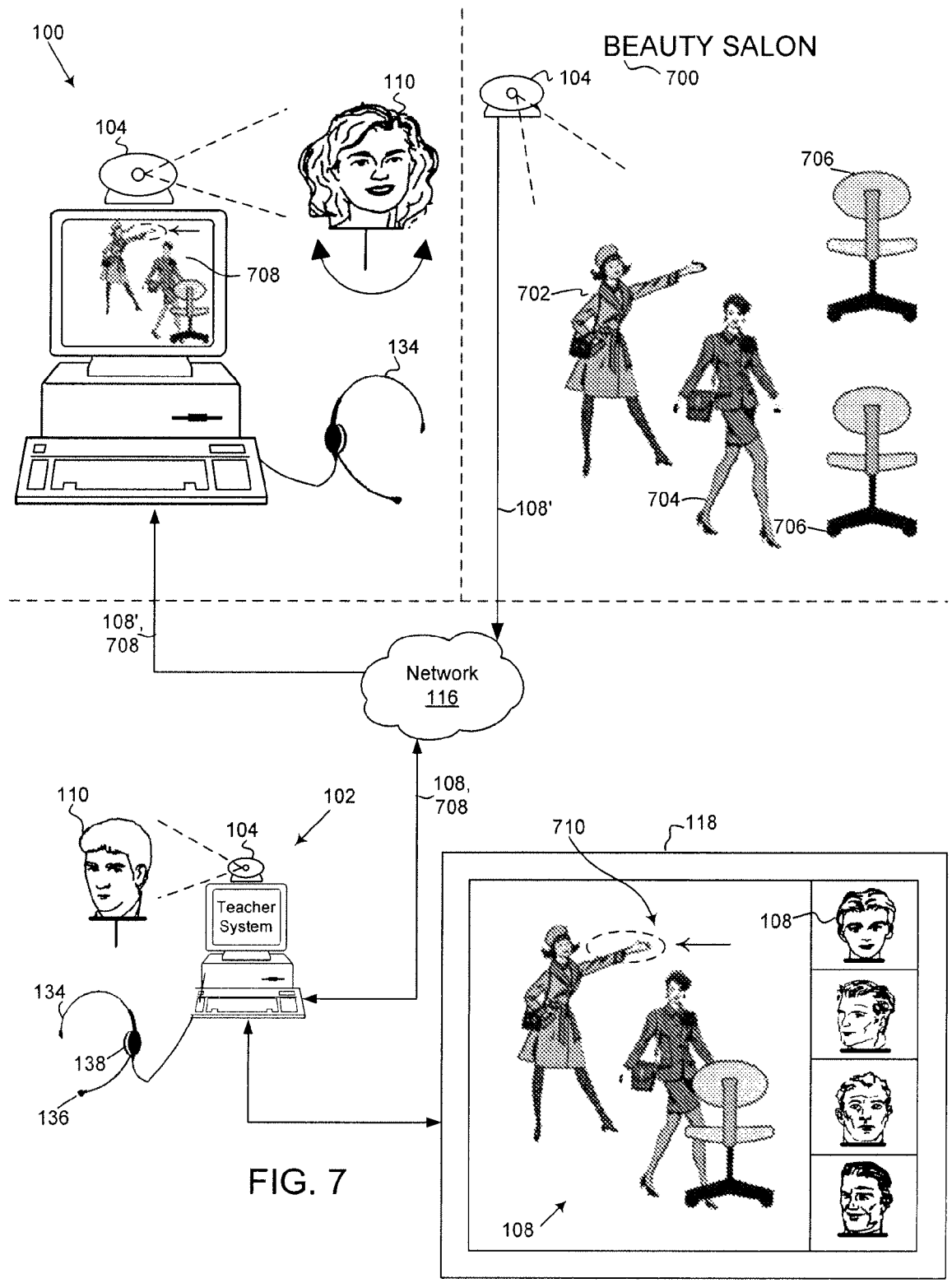
FIG. 7 is a data flow diagram illustrating a demonstration video feed being captured at a location at which a practical skill is being performed by others.

FIG. 7 illustrates an embodiment of the system of FIG. 2 in which a demonstration video feed 108 is produced from a location at which the practical skill is being performed by others (i.e., other than the learner or teacher), such as experts in the field, professionals, etc. For example, the demonstration video feed 108 may be captured at a beauty salon 700, which may be a location that is remote from the teacher's location. For instance, the beauty salon 700 could be located in Beverly Hills or Paris, allowing learners to be able to view experts in the trade demonstrate their skills.

In this example, a cosmetologist 702 is demonstrating the proper way to greet a client 704 and direct the client 704 to one of the available salon chairs 706. In one embodiment, the demonstration video feed 108 is sent over the network 116 to the teacher system 102 where the teacher has the option to selectively transmit the video feed 108 to one or more of the learners. In other embodiments, the demonstration video feed 108 could be sent directly to a plurality of learner systems 100 without passing through the teacher system 102.

The teacher may optionally transmit an annotated demonstration video feed 708 to one or more learners by adding an annotation 710 to the demonstration video feed 108 before transmission to enrich the instruction of the learner(s). The teacher may also add audible and/or textual commentary to the demonstration video feed 108 or 708 before transmission to point out, for instance, good and bad techniques, etc. The demonstration feeds 108, the annotated demonstration video feeds 608, 708 and the annotated learner-submitted video feeds 508 may be stored by the teacher in the storage device 164 of the teacher system 102.

Figure 8:
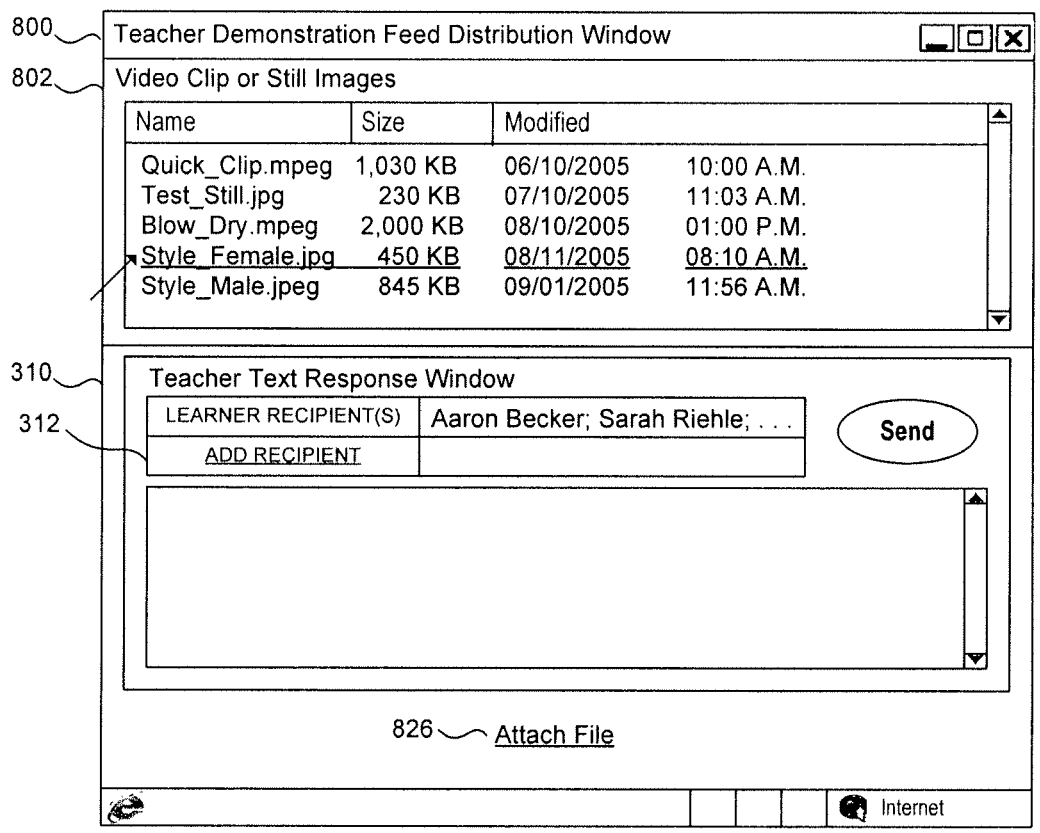
FIG. 8 is an exemplary interface for allowing a teacher to distribute stored video feeds to learners.

FIG. 8 is an interface 800 for distributing stored video feeds, which allows a teacher to distribute to learners video clips or still image files (e.g., "media files"), such as stored video feeds 108. These media files may include demonstration video feeds 108, annotated demonstration feeds 608, 708 and annotated learner-submitted video feeds 508 as recalled from the storage device 164. A browse window 802 lists the media files as stored in the storage device 164. The media files may be listed chronologically by the date/time they were created/modified or in other suitable ways. For example, the media files may also be ordered within browse window 802 according to name or size to facilitate the teacher in finding the desired media file.

In addition to distributing to one or more learners a media file, the teacher may also use the interface 800 to add a text or an audio commentary. In the teacher text response window 310, the teacher may write to one or more learner recipients a commentary regarding the distributed video clip or still image. In the "Add Recipient" box 314, the teacher may enter additional learners to which the teacher wants to send the video clip or still image file. The "Attach File" link 826 allows the teacher to add an audio commentary, such as a saved voice message, if the teacher desires.

Figure 9:
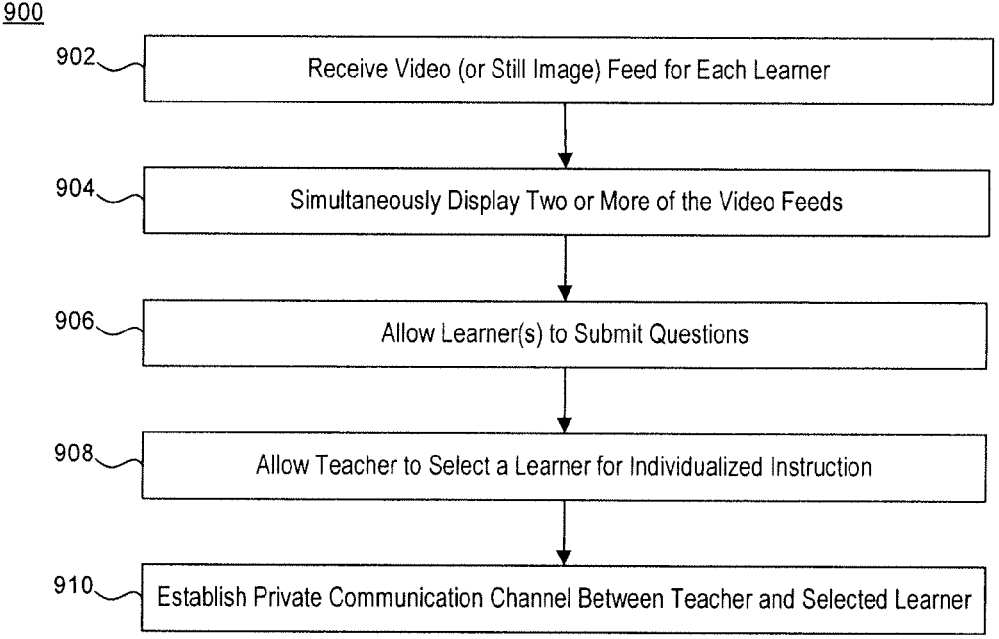
FIGS. 9-13 are flow charts of methods for teaching a practical skill to learners at geographically separate locations.

FIG. 9 is a flow chart of a method 900 for teaching a practical skill to learners and geographically separate locations. In one embodiment, the teacher system 102 receives 902 video feeds 108 from each learner system 100. The teacher system 102 then simultaneously displays 904 two or more of the learner video feeds 108 on a display screen 118.

The method 900 further allows 906 the learners to submit questions to the teacher, either textually or via audio. The teacher may subsequently be allowed 908 to select a learner from those who have submitted questions for individualized instruction. The teacher may then be allowed 910 to establish a private communication channel with the selected learner in order to provide the individualized instruction.

Figure 10:
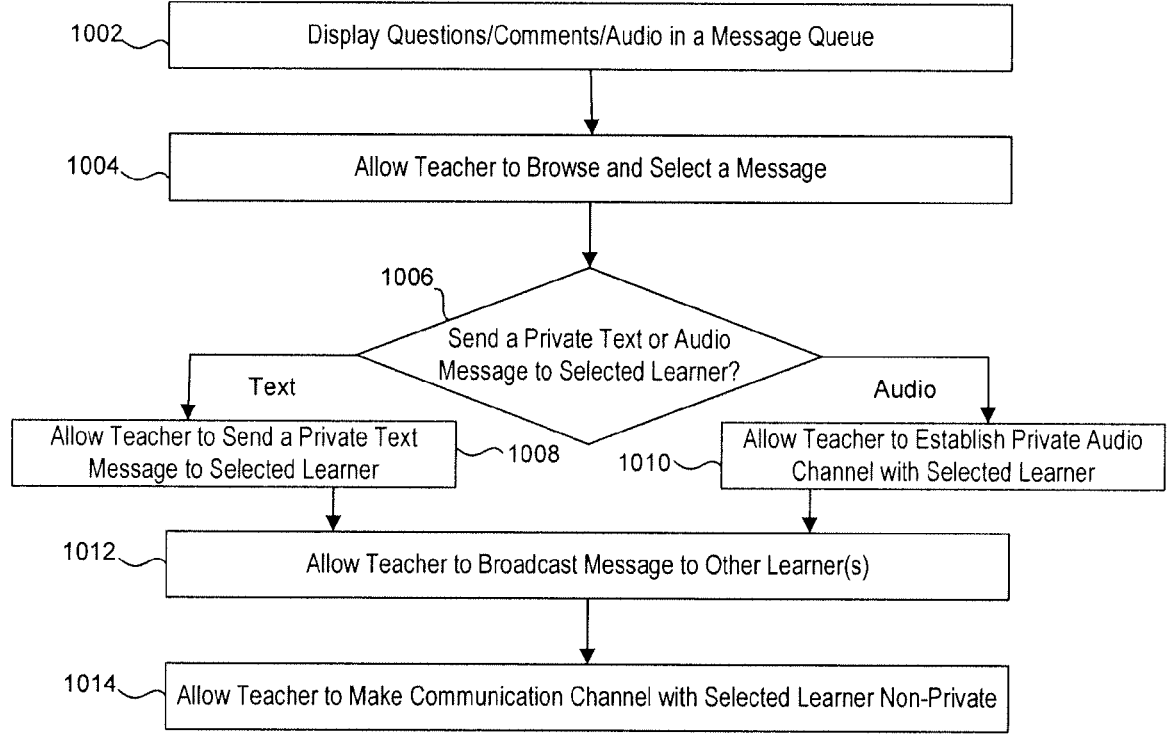

FIG. 10 is a flow chart of a method 1000, which includes the display 1002 of text questions and comments, or audio messages, in a message queue 302, 402. The method 1000 allows 1004 a teacher to browse the displayed messages and select a message to which to respond. The teacher may then choose 1006 to respond by sending a private text or audio message to the selected learner. If responding by text, the teacher sends 1008 a private text message to the selected learner. If responding audibly, the teacher establishes 1010 a private audio channel with the selected learner. The method 1000 further allows 1012 the teacher to broadcast text or audio messages to other learner(s), and/or allows 1014 the teacher to make the communication channel non-private 1014.

Figure 11:
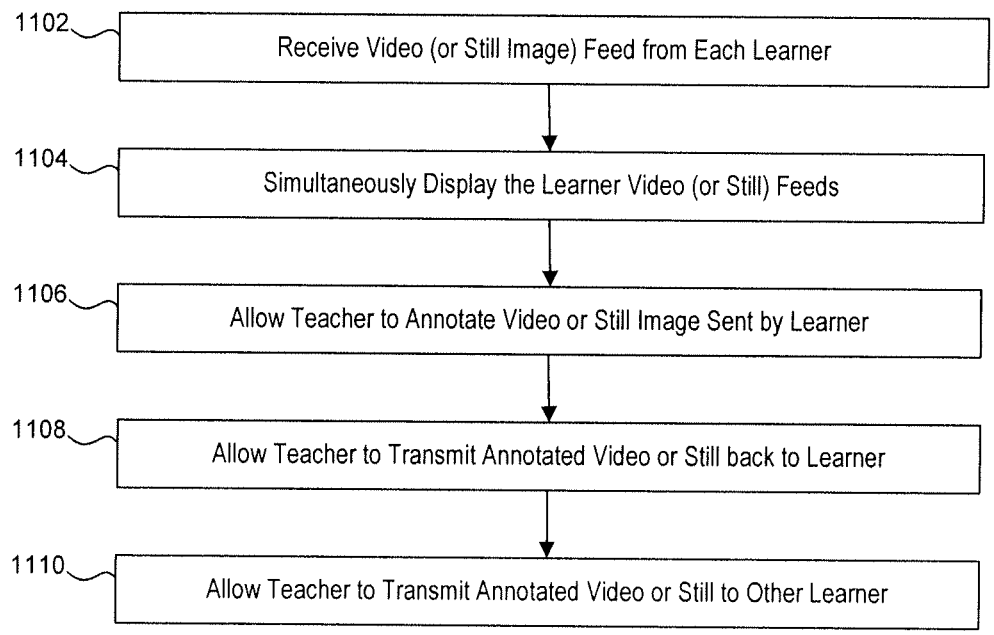

FIG. 11 is a flow chart of a method 1100 that allows a teacher, in one embodiment, to annotate a video (or still image) feed 108 sent by a learner, and to transmit the annotated video feed 108 back to at least the learner who sent it. The method 1100 includes receiving 1102 video (or still image) feeds 108 from each learner and simultaneously displaying 1104 the learners' video feeds 108 on a display screen 118. The method 1100 allows 1106 the teacher to annotate the video feed 108 sent by the learner. The method 1100 allows 1108 the teacher to transmit the annotated video feed 508 back to the selected learner. The method 1100 further allows 1110 the teacher to transmit the annotated video feed 508 to other learners.

Figure 12:
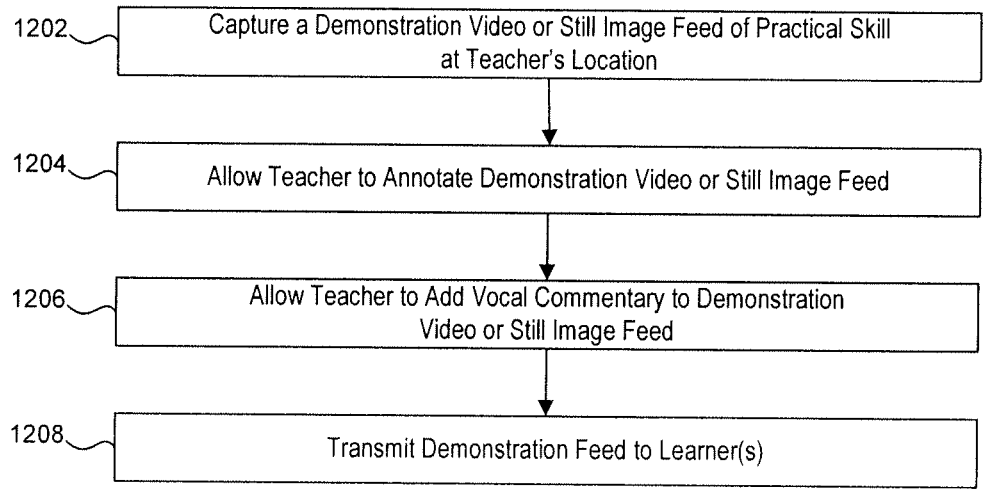

FIG. 12 is a flow chart of a method 1200, which includes capturing 1202 a demonstration video (or still image) feed 108 of a practical skill at a teacher's location, such as applied to a subject 110 in a hair salon. The method 1200 allows 1104 the teacher to annotate the demonstration feed video 108. The method 1200 allows 1206 the teacher to add vocal commentary, such as an audio message, to the annotated demonstration feed 708. The teacher transmits 1208 the demonstration video feed 108 (and vocal commentary if attached) to one or more learners for display on the learner system 100.

Figure 13:
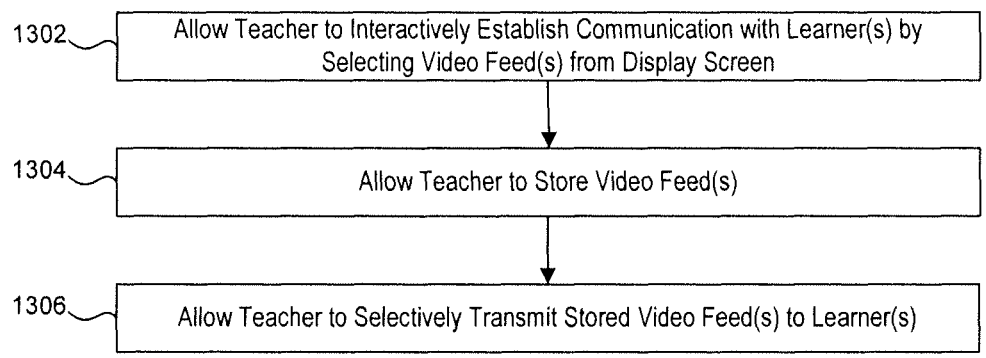

FIG. 13 is a flow chart of a method 1300 that allows 1302 a teacher to interactively establish communication with a learner by selecting a video feed 108 from a display screen 118. The method 1300 also allows 1304 the teacher to store the video feeds 108 in a storage device 164 for later retrieval. The method 1300 allows 1306 the teacher to selectively transmit the stored video feeds to one or more learners for display on the learner system 100. The stored video feeds may include video feeds 108 and annotated video feeds 508, in addition to demonstration video feeds 108 and annotated demonstration video feeds 608, 708.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A method for teaching a practical skill to a plurality of learners at geographically separate locations, comprising:
   receiving at a teacher's computer system, for each learner, a video feed generated by a camera at the learner's location, the video feed at least partially depicting both the learner and a subject on which the learner is demonstrating the practical skill;
   simultaneously displaying two or more of the video feeds on a display screen associated with the teacher's computer system;
   receiving and displaying at the teacher's computer system one or more private questions to the teacher from one or more learners, the private questions not being conveyed to the other learners unless authorized by the teacher; and
   allowing the teacher to select one of the learners for individualized instruction by selecting an indication of the corresponding displayed private question;
   wherein the private questions can be submitted by one or more selected learners via a text message, an audio or a video;
   wherein the teacher responds to the one or more selected learners by a text message, audio or video by establishing a private video or audio communication channel between the teacher's computer system and the selected learner;
   wherein the teacher broadcasts the text, audio or video messages to a group of the selected learners by allowing the communication channel to be non-private for the group of selected learners to receive the instruction provided by the teacher;
   wherein allowing the teacher to store the video feeds, annotating the stored video feeds and selectively transmit the annotated stored video feed to one or more selected learners.

2. The method of claim 1, further comprising:
   enlarging the video feed for the selected learner as displayed at the teacher's location.

3. The method of claim 1, further comprising:
   automatically cycling through the display of a plurality of different video feeds in a particular location of the display screen.

4. The method of claim 1, wherein the camera is movable to view different portions of the subject.

5. The method of claim 1, wherein the camera has a fixed field of view, and wherein the subject is placed on a rotatable base to allow the subject to be rotated within the fixed field of view.

6. The method of claim 1, wherein the practical skill comprises manicures, pedicures, application of artificial nails, hair cutting and styling, shampooing hair, cosmetic application, body hair removal, chemical hair relaxers or straighteners, permanent waves, coloring and highlighting hair, hair extensions or wig treatments.

7. The method of claim 6, wherein the subject comprises a mannequin head.

8. The method of claim 1, wherein the questions comprise text messages.

9. The method of claim 8, wherein allowing the teacher to select one of the learners comprises:
   displaying the text messages in a text message queue; and
   allowing the teacher to browse and select one of the text messages in the text message queue.

10. The method of claim 9, further comprising: allowing the teacher to send a private text message to the selected learner.

11. The method of claim 1, wherein the questions comprise audio messages.

12. The method of claim 11, wherein allowing the teacher to select one of the learners comprises:
   displaying a list of the audio messages in an audio message queue; and
   allowing the teacher to browse and select one of the audio messages in the audio message queue.

13. The method of claim 12, further comprising: allowing the teacher to send a private text message to the selected learner.

14. The method of claim 1, further comprising:
   allowing the teacher to broadcast the private question of the selected learner to one or more of the other learners.

15. The method of claim 14, further comprising:
   allowing the teacher to make the communication channel with the selected learner non-private to enable one or more of the other learners to receive the instruction provided by the teacher to the selected learner.

16. The method of claim 1, wherein the video feed is annotated by adding text.

17. The method of claim 1, wherein the video feed is annotated by adding graphics.

18. The method of claim 1, further comprising:
   allowing the teacher to transmit the annotated video feed back to the selected learner for display on a display device at the selected learner's location.

19. The method of claim 1, further comprising:
   allowing the teacher to transmit the annotated video feed to one or more of the other learners for display on one or more display devices at the learners' respective locations.

20. The method of claim 1, further comprising:
   capturing a demonstration video feed depicting at least a subject on which the teacher is demonstrating the practical skill using one or more cameras at the teacher's location; and transmitting the demonstration video feed from the teacher's location to one or more of the learners for display on display screens at the respective learners' locations.

21. The method of claim 20, further comprising: allowing the teacher to annotate the demonstration video feed.

22. The method of claim 1, further comprising:
allowing the teacher to interactively establish communication with one or more of the learners by selecting their respective one or more video feeds from the display screen.

23. The method of claim 1, further comprising: allowing the teacher to store one or more of the video feeds.

24. The method of claim 23, further comprising:
allowing the teacher to selectively transmit one or more of the stored video feeds to one or more of the learners for display on display screens at the respective learners' locations.

25. The method of claim 1, further comprising:
capturing a demonstration video feed depicting a location at which the practical skill is being performed by others; and
allowing the teacher to selectively transmit the demonstration video feed to one or more of the learners for display on display screens at the respective learners' locations.

26. The method of claim 25, further comprising: allowing the teacher to annotate the demonstration video feed.

27. The method of claim 26, further comprising: allowing the teacher to add a vocal commentary to the demonstration video feed.

28. The method of claim 25, wherein the location at which the practical skill is being performed is a hair salon.

29. The method of claim 1, wherein at least one question is accompanied by a still image or video clip captured by a camera at a respective learner's location.

30. A non-transitory computer-readable medium comprising program code for causing a computer to perform a method, comprising:
receiving, for each learner, a video feed generated by a camera at the learner's location, the video feed at least partially depicting both the learner and a subject on which the learner is demonstrating the practical skill;
simultaneously displaying two or more of the video feeds for the plurality of learners at a location of the teacher;
receiving and displaying one or more private questions to the teacher from one or more learners, the private questions not being conveyed to the other learners unless authorized by the teacher; and
allowing the teacher to select one of the learners for individualized instruction by selecting an indication of the corresponding displayed private question;
wherein the private questions can be submitted by one or more selected learners via a text message, an audio or a video;
wherein the teacher responds to the one or more selected learners by a text message, audio or video by establishing a private video and/or audio communication channel between the teacher's computer system and the selected learner;
wherein the teacher broadcasts the text, audio or video messages to a group of the selected learners by allowing the communication channel to be non-private for the group of selected learners to receive the instruction provided by the teacher;
wherein allowing the teacher to store the video feed, annotating the stored video feed and selectively transmit the annotated stored video feed to one or more selected learners.

31. The non-transitory computer-readable medium of claim 30, further comprising program code for causing a computer to perform a method comprising:
enlarging the video feed for the selected learner as displayed at the teacher's location.

32. The non-transitory computer-readable medium of claim 30, further comprising program code for causing a computer to perform a method comprising:
automatically cycling through the display of a plurality of different video feeds in a particular location of the display screen.

33. The non-transitory computer-readable medium of claim 30, wherein the practical skill comprises manicures, pedicures, application of artificial nails, hair cutting and styling, shampooing hair, cosmetic application, body hair removal, chemical hair relaxers or straighteners, permanent waves, coloring and highlighting hair, hair extensions or wig treatments.

34. The non-transitory computer-readable medium of claim 33, wherein the subject comprises a mannequin head.

35. The non-transitory computer-readable medium of claim 30, wherein the questions comprise text messages.

36. The non-transitory computer-readable medium of claim 35, further comprising program code for causing a computer to perform a method comprising:
displaying the text messages in a text message queue; and
allowing the teacher to browse and select one of the text messages in the text message queue.

37. The non-transitory computer-readable medium of claim 36, further comprising program code for causing a computer to perform a method comprising:
allowing the teacher to send a private text message to the selected learner.

38. The non-transitory computer-readable medium system of claim 30, wherein the questions comprise audio messages.

39. The non-transitory computer-readable medium of claim 38, further comprising program code for causing a computer to perform a method comprising:
displaying a list of the audio messages in an audio message queue; and
allowing the teacher to browse and select one of the audio messages in the audio message queue.

40. The non-transitory computer-readable medium of claim 39, further comprising program code for causing a computer to perform a method comprising:
allowing the teacher to send a private text message to the selected learner.

41. The non-transitory computer-readable medium of claim 39, further comprising program code for causing a computer to perform a method comprising:
allowing the teacher to establish a private audio communication channel with the selected learner.

42. The non-transitory computer-readable medium of claim 30, further comprising program code for causing a computer to perform a method comprising:
allowing the teacher to broadcast the private question of the selected learner to one or more of the other learners.

43. The non-transitory computer-readable medium of claim 42, further comprising program code for causing a computer to perform a method comprising:
allowing the teacher to make the communication channel with the selected learner non-private to enable one or more of the other learners to receive the instruction provided by the teacher to the selected learner.

44. The non-transitory computer-readable medium of claim 30, wherein the video feed is annotated by adding text.

45. The non-transitory computer-readable medium of claim 30, wherein the video feed is annotated by adding graphics.

46. The non-transitory computer-readable medium of claim 30, further comprising program code for causing a computer to perform a method comprising:
allowing the teacher to transmit the annotated video feed back to the selected learner for display on a display device at the selected learner's location.

47. The non-transitory computer-readable medium of claim 30, further comprising program code for causing a computer to perform a method comprising:
allowing the teacher to transmit the annotated video feed to one or more of the other learners for display on one or more display devices at the learners' respective locations.

48. The non-transitory computer-readable medium of claim 30, further comprising program code for causing a computer to perform a method comprising:
capturing a demonstration video feed depicting at least a subject on which the teacher is demonstrating the practical skill using one or more cameras at the teacher's location; and
transmitting the demonstration video feed from the teacher's location to one or more of the learners for display on display screens at the respective learners' locations.

49. The non-transitory computer-readable medium of claim 48, further comprising program code for causing a computer to perform a method comprising:
allowing the teacher to annotate the demonstration video feed.

50. The non-transitory computer-readable medium of claim 30, further comprising program code for causing a computer to perform a method comprising:
allowing the teacher to interactively establish communication with one or more of the learners by selecting their respective one or more video feeds from the display screen.

51. The non-transitory computer-readable medium of claim 30, further comprising program code for causing a computer to perform a method comprising:
allowing the teacher to store one or more of the video feeds.

52. The non-transitory computer-readable medium of claim 51, further comprising program code for causing a computer to perform a method comprising:
allowing the teacher to selectively transmit one or more of the stored video feeds to one or more of the learners for display on display screens at the respective learners' locations.

53. The non-transitory computer-readable medium of claim 30, further comprising program code for causing a computer to perform a method comprising:
capturing a demonstration video feed depicting a location at which the practical skill is being performed by others; and
allowing the teacher to selectively transmit the demonstration video feed to one or more of the learners for display on display screens at the respective learners' locations.

54. The non-transitory computer-readable medium of claim 53, further comprising program code for causing a computer to perform a method comprising:
allowing the teacher to annotate the demonstration video feed.

55. The non-transitory computer-readable medium of claim 54, further comprising program code for causing a computer to perform a method comprising:
allowing the teacher to add a vocal commentary to the demonstration video feed.

56. The non-transitory computer-readable medium of claim 53, wherein the location at which the practical skill is being performed is a hair salon.

57. The non-transitory computer-readable medium of claim 30, further comprising program code for causing a computer to perform a method comprising:
associating at least one question with by a still image or video clip captured by a camera at a respective learner's location.

58. The non-transitory computer-readable medium of claim 48, further comprising program code for causing a computer to perform a method comprising:
allowing a learner to pause, fast forward, and rewind the demonstration video feed.

59. A method for teaching cosmetology to a plurality of learners at geographically separate salons, comprising:
capturing a demonstration video feed at a teacher's location using a camera, the video feed at least partially depicting both the teacher and a first mannequin head on which the teacher is demonstrating a practical skill relating to cosmetology;
transmitting the demonstration video feed from the teacher's location to one or more of the learners for display on display screens at the respective learners' salons;
receiving at a teacher's computer system, for each learner, a video feed generated by a camera at each learner's salon, the video feed at least partially depicting both the learner and a mannequin head on which the learner is demonstrating the practical skill shown in the demonstration video feed;
simultaneously displaying two or more of the video feeds on a display screen associated with the teacher's computer system;
receiving and displaying at the teacher's computer system one or more private questions to the teacher from one or more learners, the private questions not being conveyed to the other learners unless authorized by the teacher, and at least one of the private questions being accompanied by a still image or video clip captured by the camera at the learner's salon;
allowing the teacher to select one of the learners for individualized instruction by selecting an indication of the corresponding displayed private question; and
establishing a private video or audio communication channel between the teacher's computer system and the selected learner.
allowing the teacher to store the video feed, annotating the stored video feed and selectively transmit the annotated stored video feed to one or more selected learners.

* * * * *